(12) United States Patent
Dobmeier et al.

(10) Patent No.: US 9,982,813 B2
(45) Date of Patent: May 29, 2018

(54) SWAGE FITTING

(71) Applicant: Designed Metal Connections, Inc., Gardena, CA (US)

(72) Inventors: John Russell Dobmeier, Garden Grove, CA (US); May Danhash, Sherman Oaks, CA (US)

(73) Assignee: Designed Metal Connections, Inc., Gardena, CA (US)

( * ) Notice: Subject to any disclaimer, the term of this patent is extended or adjusted under 35 U.S.C. 154(b) by 235 days.

(21) Appl. No.: 14/671,796

(22) Filed: Mar. 27, 2015

(65) Prior Publication Data

US 2016/0281887 A1  Sep. 29, 2016

(51) Int. Cl.
*F16L 13/14* (2006.01)

(52) U.S. Cl.
CPC ............ *F16L 13/14* (2013.01); *F16L 13/146* (2013.01)

(58) Field of Classification Search
CPC ....... F16L 13/14; F16L 13/146; F16L 13/165; F16L 13/16
USPC .................................. 285/382, 382.1, 382.2
See application file for complete search history.

(56) References Cited

U.S. PATENT DOCUMENTS

| | | | |
|---|---|---|---|
| 1,186,812 A * | 6/1916 | McFerran | F16L 19/0653 285/133.11 |
| 1,186,813 A * | 6/1916 | McFerran | F16L 19/0653 285/341 |
| 1,969,142 A * | 8/1934 | McIntyre | F16L 19/14 285/339 |
| 2,078,903 A * | 4/1937 | Domack | F16K 1/422 251/365 |
| 2,613,959 A * | 10/1952 | Richardson | F16L 19/106 285/341 |
| 3,149,860 A * | 9/1964 | Hallesy | F16L 13/146 285/18 |
| 3,201,859 A * | 8/1965 | Stanley | B21D 39/046 285/382.2 |
| 3,484,123 A * | 12/1969 | Velden | F16L 19/0206 285/341 |
| 3,730,567 A * | 5/1973 | Webster | B21D 39/04 285/382.4 |
| 4,147,385 A * | 4/1979 | Van Der Velden | F16L 19/0206 285/382.4 |
| 4,805,945 A * | 2/1989 | Foucault | B21D 39/04 285/341 |
| 5,058,936 A * | 10/1991 | Kapgan | B23P 11/025 285/382 |
| 5,088,771 A * | 2/1992 | Hosseinian | B25B 27/10 285/382.2 |

(Continued)

OTHER PUBLICATIONS

International Search Report (PCT/ISA/210) dated May 26, 2016 for corresponding PCT Application PCT/US2016/023147 cites the U.S. patent and publication documents.

*Primary Examiner* — Aaron M Dunwoody
(74) *Attorney, Agent, or Firm* — Baker & Hostetler LLP (57) ABSTRACT

A swage fitting for connection of tubes by axial swaging includes a fitting body having a generally cylindrical body and an internal axial bore. A swage end of the fitting body includes a tapered inner surface that compresses a tapered outer surface of a sleeve into the tube when the fitting body is swaged to the sleeve and the tube. An adapter end of the fitting body may be fastened by a permanent or separable connection to another part.

6 Claims, 5 Drawing Sheets

(56) References Cited

U.S. PATENT DOCUMENTS

| | | | |
|---|---|---|---|
| 5,219,186 A * | 6/1993 | Hosseinian | B25B 27/10 285/382.2 |
| 5,560,661 A * | 10/1996 | Babel | F16L 13/146 285/329 |
| 6,108,895 A * | 8/2000 | Helsley, Jr. | B25B 27/10 285/382.7 |
| 6,450,553 B1 | 9/2002 | Suresh | |
| 6,517,126 B1 | 2/2003 | Peterson et al. | |
| 6,619,701 B1 * | 9/2003 | Udhofer | F16L 13/141 285/256 |
| 7,847,223 B2 * | 12/2010 | Fischer | B21D 26/14 219/607 |
| 8,458,876 B2 | 6/2013 | Danhash | |
| 2006/0186666 A1 * | 8/2006 | McKay | F16L 13/146 285/382 |
| 2007/0108760 A1 * | 5/2007 | McKay | F16L 13/146 285/256 |
| 2011/0095529 A1 | 4/2011 | Spencer | |
| 2011/0169262 A1 * | 7/2011 | Sinoplu | F16L 13/141 285/242 |
| 2012/0205910 A1 | 8/2012 | Danhash | |
| 2013/0020800 A1 * | 1/2013 | Heraud | F16L 13/141 285/382.1 |
| 2013/0093184 A1 * | 4/2013 | Peirce | B25B 27/10 285/323 |
| 2013/0277960 A1 * | 10/2013 | Neal | F16L 19/028 285/93 |

* cited by examiner

SWAGE FITTING

BACKGROUND OF THE INVENTION

Field of the Invention

This invention relates to a swage fitting and a method of assembly thereof.

Description of Related Art

Swage fittings are known to connect tubes and pipes to each other to form fluid-tight connections in applications where a secure connection is critical, such as in aerospace, marine, petroleum and chemical industries. An axial swage tool is used to swage fittings to a tube.

During the swaging operation, the fitting is compressed axially by the swaging tool. The fitting's inner sleeve is compressed radially into the tube with a progressively diminished diameter. As a result, the tube is compressed into an hourglass shape with annular indentations formed in the tube, thereby securing it in the fitting with a metal-to-metal seal.

A typical swaged fitting includes a sleeve for receiving a tube and a swage ring sized to receive the sleeve. The swage ring includes an inner tapered surface that engages with a tapered outer surface of the sleeve prior to swaging. Some swage rings may be formed of a plurality of distinct pieces.

During swaging, the swage ring is moved axially in a forward direction over the sleeve such that interaction of the tapered surfaces on the ring and sleeve deforms the sleeve and tube inwardly to form a swaged connection between them. The swage ring and sleeve are thus permanently swaged to the tube.

Other known end fittings for a tube include a male end fitting assembly used with a female fitting. The female end fitting includes a sleeve placed over a tube and a nut. The male fitting has a threaded outer surface for screwing into the nut, and a conical inner surface for receiving the tubing and the sleeve of the female end fitting assembly. As the nut is advanced axially, the sleeve is mated to the adapter fitting. The prior art suffers from the problem that these swage fittings have undesirable mass compared to the same length of tubing.

SUMMARY OF THE INVENTION

The present invention provides a swage fitting that is compact and that has a weight that is reduced by about 20-25% relative to conventional assemblies. The swage fitting of the invention does not have a conventional swage ring. The invention minimizes the size, weight and number of parts relative to conventional solutions, and may be installed using a swage tool. Assembly of the fitting to a tube is thus simplified, resulting in a more efficient and reliable swaging. Reduced weight also allows the swage fitting to be utilized with tubes in smaller spaces.

A first embodiment of the invention is a swage fitting for attachment to a tube. The swage fitting includes a generally cylindrical fitting body having an internal axial bore. A swage end of the fitting body includes a tapered inner surface that compresses a tapered outer surface of a sleeve into the tube when the fitting is swaged to the sleeve and the tube.

In the first embodiment of the invention, the swage end of the fitting body may include an annular groove. The tapered inner surface of the fitting body may include a shoulder. The fitting body may connect the tube to another tube or fitting when the swage end is swaged to the sleeve and the tube and when an adapter end is connected to a mating fitting assembly.

A second embodiment of the invention is a swage fitting for attachment to a tube. A sleeve defines an axial bore and has an inner surface for receiving the tube and a tapered outer surface. During swaging a tapered inner surface of a fitting body compresses the tapered outer surface of the sleeve applying a radial swage force to the tube inwardly to make a swaged connection. The swage force is applied directly to the fitting and tube by an axial swage tool.

In the second embodiment of the invention, the tapered outer surface of the sleeve may include a shoulder that restricts axial movement of the sleeve. The tapered outer surface of the sleeve may include a protrusion. The tapered inner surface of the fitting body may be directly swaged to the tapered outer surface of the sleeve. The fitting body may fit an axial swage tool.

A third embodiment of the invention is a method of attaching a swage fitting and a tube. A sleeve having a tapered outer surface is inserted into an axial bore of a fitting body having a tapered inner surface. The tube is inserted into an axial bore of the sleeve. The fitting body is placed into an axial swage tool and is axially swaged to the sleeve and the sleeve to the tube by swaging the tapered inner surface of the fitting body to the tapered outer surface of the sleeve.

In the third embodiment of the invention, a swage end of the fitting body may be swaged to the sleeve and an adapter end of the fitting body may be mated to a separable end fitting assembly. The adapter end may be male or female flareless, beam seal, flared, weld or any other configuration for fastening to another fitting or tube. Axial movement of the sleeve and the tube may be restricted during axial swaging by a shoulder formed on the fitting body. Axial movement of the fitting body with respect to the sleeve may be inhibited by a groove formed on the tapered inner surface of the fitting body swaged to a protrusion formed on the tapered outer surface of the sleeve.

Other embodiments, features and advantages of the invention will be apparent from the following detailed description and drawings that illustrate, by way of example, various features of the invention.

DETAILED DESCRIPTION OF THE INVENTION

Figure 1:
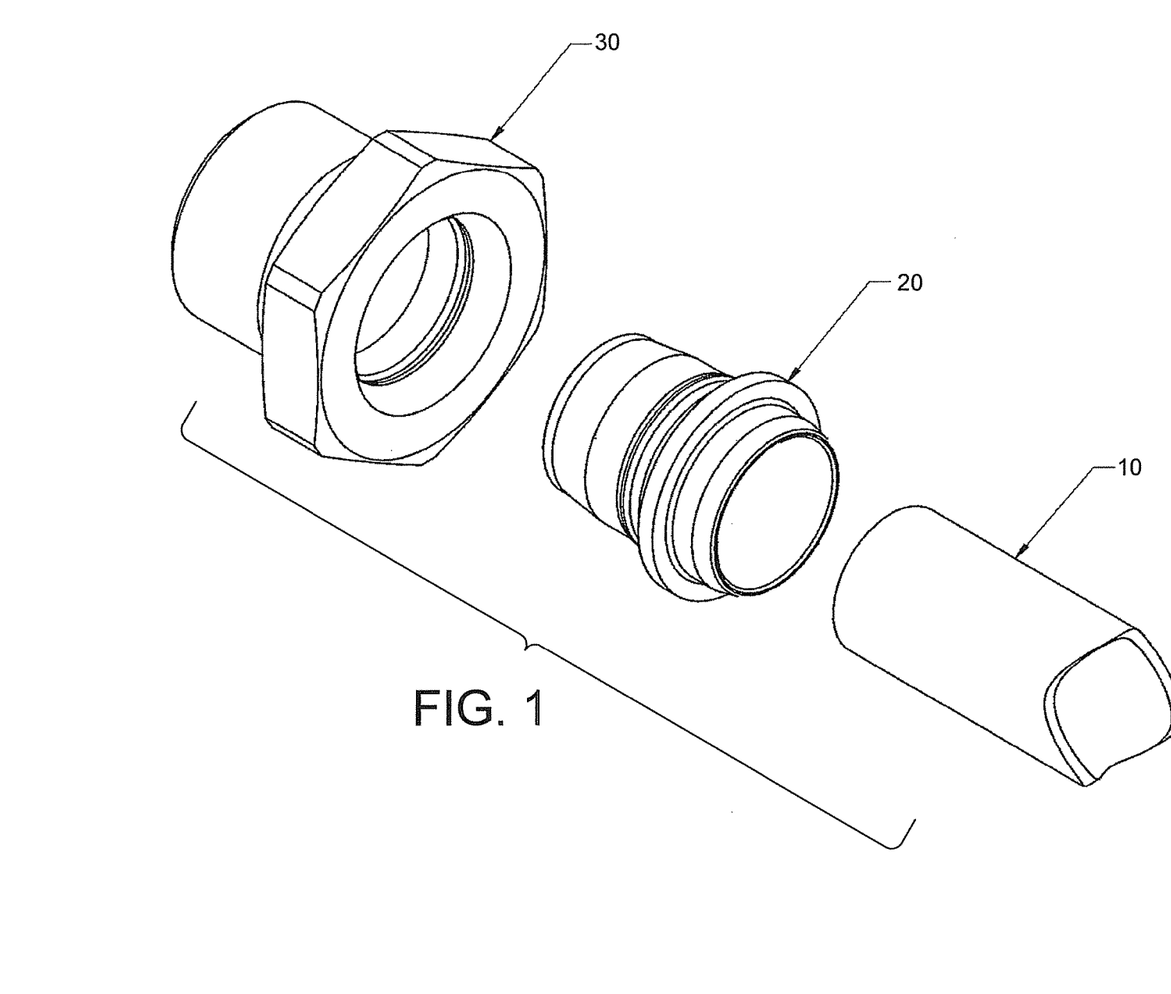
FIG. 1 is a disassembled perspective view of a tube, a sleeve and a fitting body according to the invention.

FIGS. 1-5 illustrate a swage fitting assembly according to the invention. FIG. 1 is a disassembled perspective view of a tube 10, a sleeve 20 and a fitting body 30. Tube 10, sleeve 20 and fitting body 30 each have a generally cylindrical configuration and an axial bore sized such that sleeve 20 is received on tube 10 and fitting body 30 is received on sleeve 20.

Figure 5A:
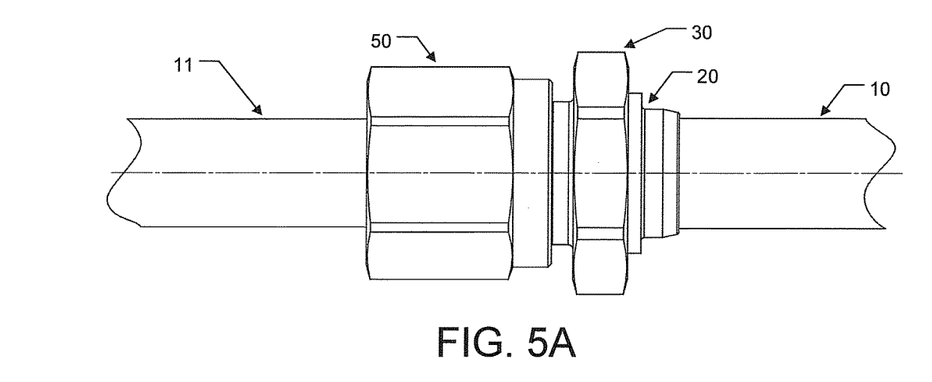
FIG. 5A is a perspective view of the swage fitting assembled with a mating part according to the invention.
Figure 5B:
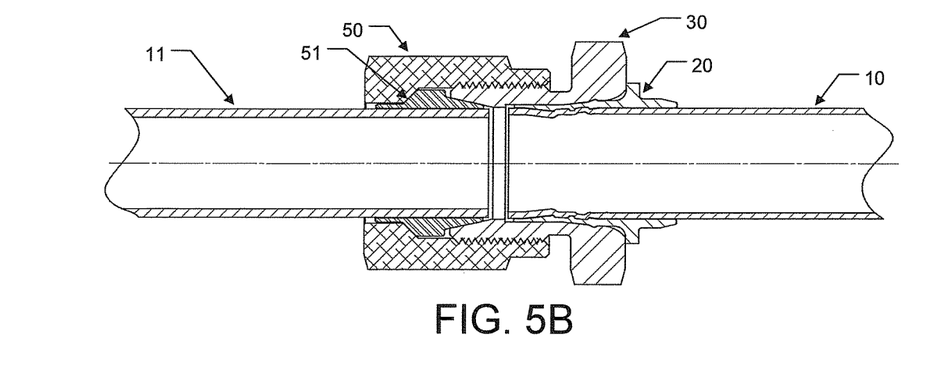
FIG. 5B is a cross-sectional view of the swage fitting assembled with a mating part according to the invention.

Tube 10 may be any standard tube or other tube that is substantially cylindrical. The outer surface of sleeve 20 is configured to accept fitting body 30. Fitting body 30 is a connector for mating to another part, tube or device that may have a different size, design, etc., thereby enabling the other part or device to be joined together with tube 10 via fitting body 30. For example, FIGS. 5A-5B show fitting body 30 mated to a flareless fitting assembly including another tube 11.

Sleeve 20 and fitting body 30 may be formed from any suitable material. For example, sleeve 20 and fitting body 30 may be constructed from a homogenous material such as copper, brass, stainless steel, Incoloy, aluminum, titanium or the like. Sleeve 20 and fitting body 30 may alternatively be formed of a composite material. Sleeve 20 and fitting body 30 may be scaled as necessary for tubes 10 of different sizes and applications. Internal and external features of sleeve 20 and fitting body 30 are illustrated in FIGS. 2-5 and are described in detail below.

Figure 2A:
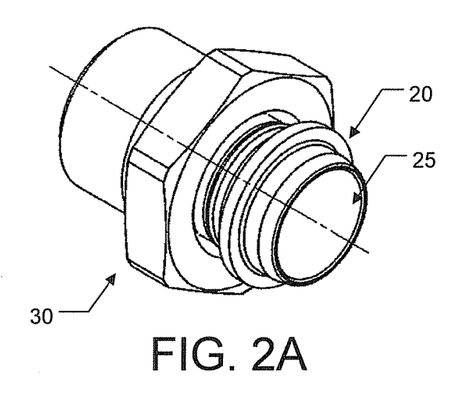
FIGS. 2A-2B are preswaged perspective views of the sleeve and the fitting body according to the invention.
Figure 2B:
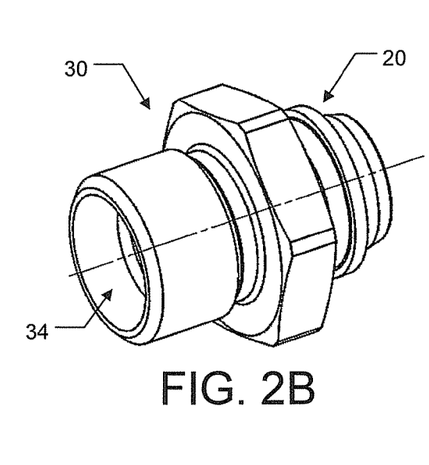

FIGS. 2A-2B are perspective views of sleeve 20 and fitting body 30 in which sleeve 20 is preswaged in fitting body 30. Together, sleeve 20 and fitting body 30 comprise a swage fitting assembly for attachment to a tube. Sleeve 20 has an axial bore 25 (FIG. 2A) and fitting body 30 has an axial bore 34 (FIG. 2B). Before a swaging operation, sleeve 20 may be removably preset within fitting body 30.

Figure 3:
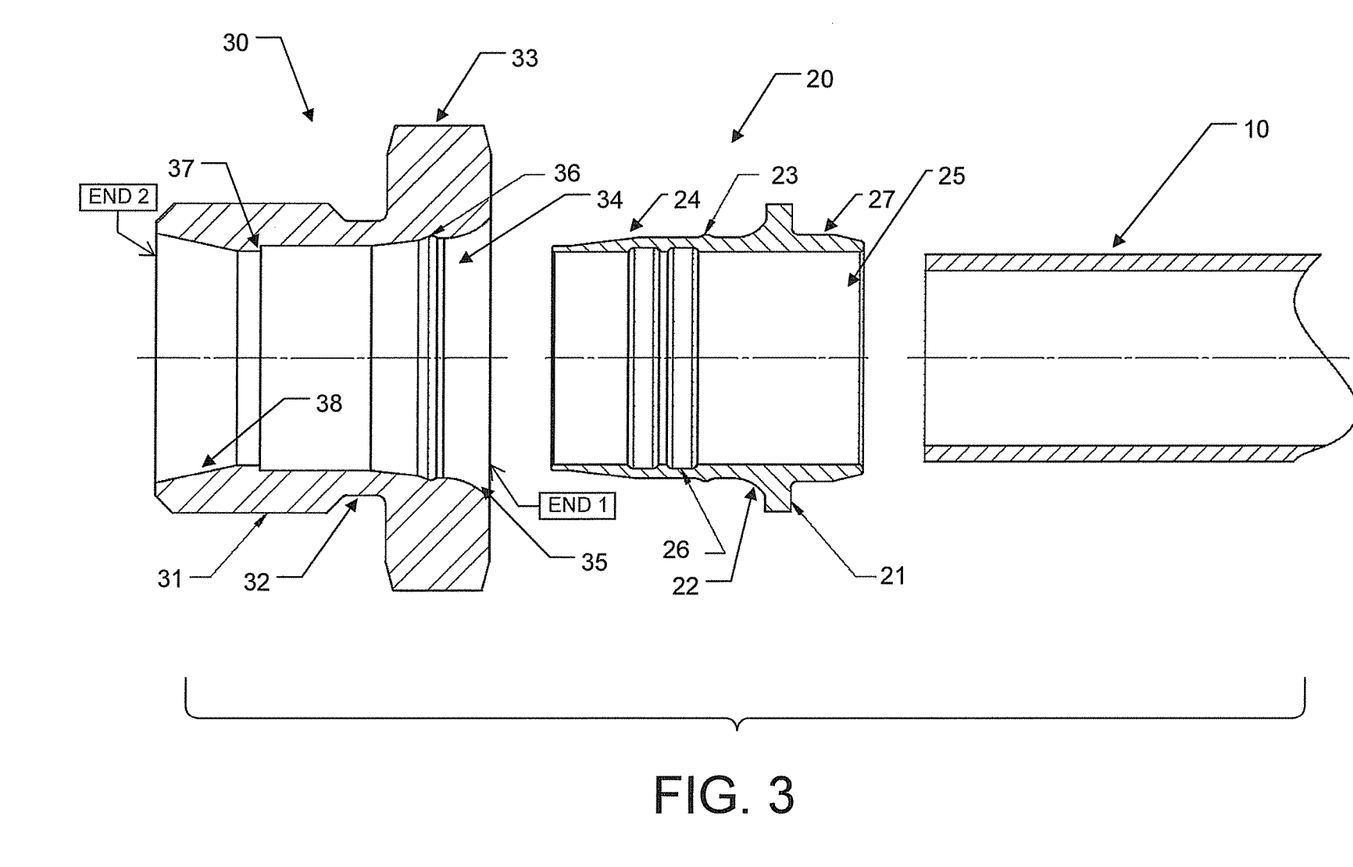
FIG. 3 is a disassembled cross-sectional view of the tube, sleeve and fitting body according to the invention.

Sleeve 20 includes an inner surface for receiving a tube and a tapered outer surface 24 (FIG. 3). Fitting body 30 includes a tapered inner surface configured to axially swage fitting body 30 to sleeve 20 and the tube.

In attaching the swage fitting to a tube, sleeve 20 is preset into axial bore 34 of fitting body 30, and the tube is inserted into axial bore 25 of sleeve 20. Fitting body 30 is axially swaged to sleeve 20, and sleeve 20 is swaged to tube 10, by swaging the inner surface of fitting body 30 to the tapered outer surface of sleeve 20.

The preswaged sleeve 20 and fitting body 30 may be fit into an axial swage tool and a tube inserted into axial bore 25 of sleeve 20. In swaging, the swage tool forces sleeve 20 into fitting body 30 to lock them into place with an interference fit. An example of a suitable swage tool is described in U.S. Pat. No. 8,458,876, which is incorporated herein by reference. After swaging, tube 10, sleeve 20 and fitting body 30 are permanently coupled and allow fluid and/or gas from tube 10 to flow through the axial bores of sleeve 20 and fitting body 30.

FIG. 3 is a disassembled cross-sectional view of tube 10, sleeve 20 and fitting body 30. Sleeve 20, also referred to as a fitting end, includes flange 21 on its external surface for physically limiting the axial swage force applied by fitting body 30. Flange 21 is a force bearing surface when axial swaging is performed. Flange 21 may also serve as an engagement surface for a yoke of a swage tool.

One side of flange 21 includes radius 22 that is swaged against internal radius 35 of fitting body 30. Radius 22 restricts axial movement of fitting body 30. Tapered outer surface 24 of sleeve 20 extends in an axial direction from flange 21. Protrusion or locking ridge 23 is formed on tapered outer surface 24 for securing physical engagement between sleeve 20 and corresponding locking groove 36 of fitting body 30 upon swaging. On the other side of flange 21 (the side opposite to tapered outer surface 24), axial extension 27 extends in an axial direction from flange 21.

Axial bore 25 of sleeve 20 is sized to receive tube 10. Within axial bore 25, annular or sealing grooves 26 may be provided on the inner surface of sleeve 20 to bite into tube 10 upon axial swaging, thereby ensuring engagement between tube 10 and sleeve 20.

Any number of grooves 26 may be provided. In one embodiment, 2-4 grooves 26 are provided. Grooves 26 bite into tube 10 to improve sealing and to increase the force required to remove the tube from the swaged fitting. A shoulder may be formed on the inner surface of sleeve 20 to ensure that tube 10 does not slide completely through sleeve 20.

Fitting body 30 has a generally cylindrical body extending between an adapter end 31 and a swage end 33. The swage end of axial bore 34 defines tapered inner surface 35 that radially compresses tapered outer surface 24 of sleeve 20 into tube 10 when fitting body 30 is swaged to sleeve 20 and tube 10. The adapter end of axial bore 34 defines conical inner surface 38 for mating with a part.

Adapter end 31 may be, for example, a flareless male end for mating with a female end fitting assembly of a part. Swage end 33 may include a flange or hexagonal head and an internal annular groove 36. A shoulder 37 may be formed in axial bore 34. Fitting body 30 connects tube 10 to another tube when swage end 33 is swaged to sleeve 20 and tube 10, and adapter end 31 is mated to an adapter end fitting assembly of a part (FIG. 5).

Threads may be provided on an external surface of fitting body 30 for connection to a corresponding adapter or mating part. The mating part may include a female threaded fastener and/or a male end fitting. Fitting body 30 may be removably fastened and unfastened to the corresponding threaded fastener of the part. This allows the swage fitting to be permanently attached to tube 10 while a mating part is separably joined to the swaged fitting. Fitting body 30 need not necessarily include external threads so long as fitting body 30 is configured as a connector for joining another part or device to tube 10. Fitting body 30 may further be swaged by another swage fitting assembly in order to, for example, connect tube 10 to another tube via fitting body 30.

The flange or hexagonal head provided on the exterior surface of fitting body 30 at swage end 33 allows torqueing of fitting body 30 by a tool such as a wrench or the like. Recess 32 is formed between adapter end 31 and swage end 33 and provides a surface for a swage tool to secure fitting body 30 during swaging.

Axial bore 34 of fitting body 30 is sized to receive sleeve 20. The inner surface of fitting body 30 includes taper 35 for swaging directly to the outer surface of sleeve 20 including rounded shoulder 22. One or more annular grooves 36 provided along the tapered inner surface of fitting body 30 lock into corresponding protrusions 23 provided on the external surface of sleeve 20.

After swaging, groove 36 and protrusion 23 substantially inhibit axial movement of fitting body 30 with respect to sleeve 20 and help to ensure that fitting body 30 and sleeve 20 do not separate. Shoulder 37 provided on the tapered inner surface of fitting body 30 restricts axial movement of tube 10 and sleeve 20 within fitting body 30 to properly position tube 10, sleeve 20 and fitting body 30 before and after swaging.

The inner surface of fitting body 30 or outer surface of sleeve 20 may be coated with a lubricant, such as Teflon or the like, to limit metal-to-metal contact between fitting body 30 and sleeve 20. Silicon may also be applied to the grooves to improve sealing.

Fitting body 30 is a connector for mating to another part and/or device and also swages itself to sleeve 20 and sleeve 20 to tube 10. The tapered inner surface of fitting body 30 is directly swaged to the tapered outer surface of sleeve 20. Thus, the fitting assembly is provided without a separate deforming ring, as is typically required. This provides a reduction in size and weight of the fitting assembly, and simplifies swaging operation. The smaller size and weight of the swage fitting also allows swaging operations to be performed in previously inaccessible areas. During swaging, the fitting body, sleeve and tube are deformed together to form a secure and strong connection.

Figure 4A:
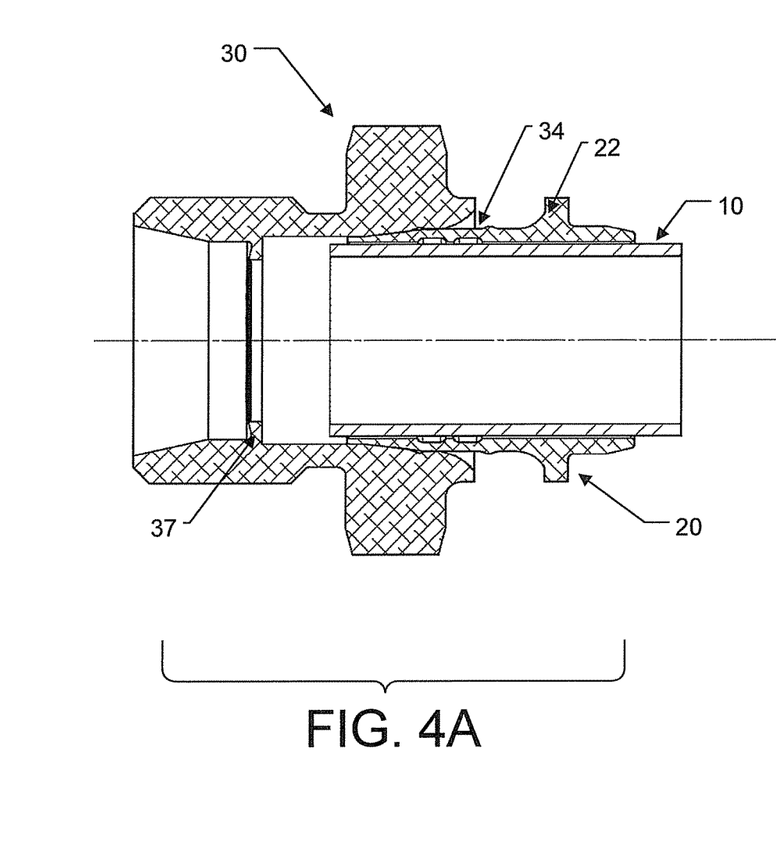
FIG. 4A is a cross-sectional view of a preswaged tube, sleeve and fitting body according to the invention.

FIG. 4A is a cross-sectional view of a preswaged fitting body 30, sleeve 20 and tube 10 according to the invention. Before swaging, the diameter of sleeve 20 is such that tube 10 may be slid at least partway through sleeve 20 without applying radial force. The inner surface taper of fitting body 30 and outer surface taper of sleeve 20 are such that sleeve 20 may be positioned partway through fitting body 30. Fitting body 30 may be mounted in a swaging tool for axial swaging. Fitting body 30 and sleeve 20 may be mounted in a swage tool prior to insertion of tube 10, but there is no requirement that it occur in this order. Without sufficient force, the increasing taper angle of sleeve 20 relative to the inner taper angle of fitting body 30 prevents sleeve 20 from sliding further into axial bore 34, as shown in FIG. 4A.

Figure 4B:
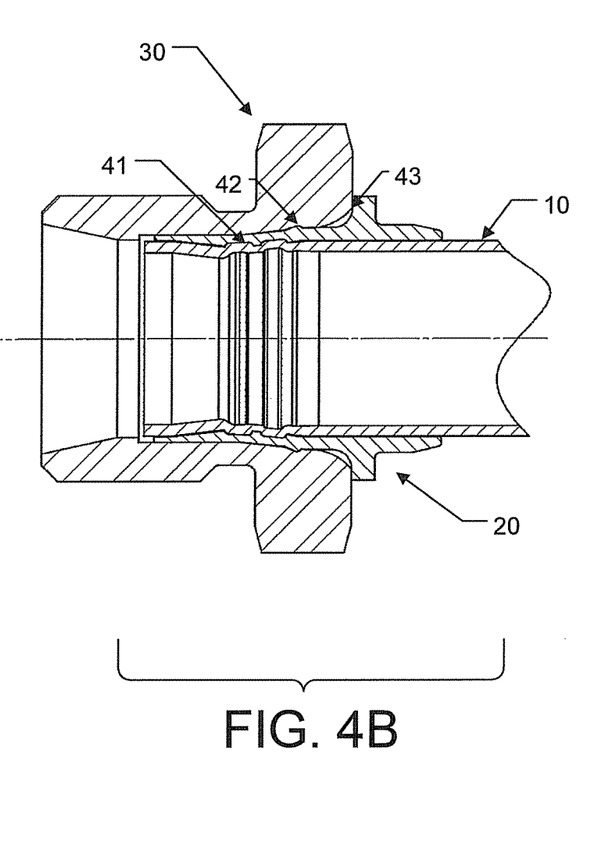
FIG. 4B is a cross-sectional view of a swaged tube, sleeve and fitting body according to the invention.

A swaging tool may hydraulically swage fitting body 30 and sleeve 20 together and deform sleeve 20 and tube 10 to form a permanent connection. FIG. 4B is a cross-sectional view of a swaged fitting body 30, sleeve 20 and tube 10 according to the invention. As a result of swaging, sleeve 20 and tube 10 are swaged together to form a permanent physical bond. In particular, the force of axial swaging reduces the interior diameter of tube 10 and sleeve 20.

During swaging, the protrusions and grooves are deformed radially inward. This deformation forms a lock that inhibits relative axial movement in a reverse direction between fitting body 30 and sleeve 20. The swaged grooves 41 bite into tube 10 and provide physical engagement between sleeve 20 and tube 10 to inhibit axial movement after swaging. Annular grooves 26 formed on the inner surface of sleeve 20 that is swaged to tube 10 inhibit axial movement of sleeve 20 with respect to tube 10.

Similarly, the swaged protrusion 42 bites into fitting body 30 and provides physical engagement between fitting body 30 and sleeve 20 to prevent axial movement after swaging. Grooves 36 formed on the tapered inner surface of fitting body 30 that is axially swaged to the tapered outer surface of sleeve 20 inhibits axial movement of fitting body 30 with respect to sleeve 20. The swaged shoulder 43 of sleeve 20 further restricts axial movement of fitting body 30 over sleeve 20. The location of the protrusions and grooves of sleeve 20 and fitting body 30 are selected to provide smooth axial loading during swaging and to increase the strength of the swaged connection.

Shoulder 37 formed on fitting body 30 also restricts axial movement of sleeve 20 and tube 10 during and after axial swaging. The frictional engagement between sleeve 20 and tube 10 in these areas inhibits reverse movement of fitting body 30, sleeve 20 and tube 10.

FIG. 5A is a perspective view of the swage fitting assembled with a mating part according to the invention. The swage fitting includes sleeve 20 and fitting body 30 swaged to tube 10. FIG. 5A illustrates fitting body 30 mated to a corresponding nut 50 to connect tube 10 to tube 11. Nut 50 may be separable from fitting body 30 so as to allow tubes 10, 11 to become assembled and disassembled. Fitting body 30 includes a swage end swaged to sleeve 20 and tube 10, and an adapter end is mated to end fitting assembly and tube 11. In this manner, fitting body 30 connects tube 10 to tube 11.

FIG. 5B is a cross-sectional view of the swage fitting assembled with a mating part according to the invention. The swage end of fitting body 30 includes a tapered inner surface compressing a tapered outer surface of sleeve 20 into tube 10 when fitting body 30 is swaged to sleeve 20 and tube 10.

Tube 11 is attached to a mating part including nut 50 and sleeve 51. At the adapter end of fitting body 30, the outer surface of fitting body 30 defines an external thread for mating with an inner thread of nut 50 to secure the connection between tube 10 and tube 11. The inner surface of the adapter end may be a conical inner surface for mating with the part such as sleeve 51 and tube 11.

For example, the adapter end of fitting body 30 may be coupled between tube 11, sleeve 51 and nut 50 to secure the connection between tube 10 and tube 11. The adapter end may form a flareless male fitting for mating with a corresponding female end fitting assembly. Thus, the swage end of fitting body 30 is swaged to sleeve 20 and the adapter end of fitting body 30 is fastened to female end fitting assembly 50, 51 and tube 11. The mating parts 50, 51 illustrated in FIGS. 5A and 5B are merely exemplary and are not limiting.

The invention provides a swage fitting that is capable of withstanding high pressures, that is lightweight and compact, and that is easily adapted to conventional swage tools. The length of time necessary to install and inspect the fitting are improved as well. The swage fitting assembly described herein may be swaged to a tube of any desired size.

The embodiments of the invention described herein are illustrative and not restrictive. Modification may be made without departing from the spirit of the invention as defined by the following claims.

The invention claimed is:

1. A swage fitting for attachment to a tube, comprising:
   a generally cylindrical fitting body having an internal axial bore that is configured to receive a sleeve that surrounds the tube and that has a tapered outer surface tapering in a radial outward direction from an end of the sleeve; and
   a swage end formed at one end of the fitting body that has a tapered inner surface tapering in a radial inward direction beginning at the swage end, and a locking groove formed in the tapered inner surface, wherein
   the tapered inner surface of the swage end is configured to compress and swage the tapered outer surface of the sleeve into the tube when the fitting body is swaged to the sleeve and the tube,
   the locking groove is configured to receive a corresponding locking protrusion formed on the tapered outer surface of the sleeve to secure physical engagement between the sleeve and the fitting body during swaging,
   an adapter end of the fitting body is configured to mate with an end fitting assembly,
   the swage end has a greater outer diameter than the adapter end and includes a hexagonal head; and
   a recess is formed between the adapter end and the swage end and provides a surface for a swage tool to secure the fitting body during swaging.

2. The swage fitting of claim 1, wherein the tapered inner surface of the fitting body is configured to swage directly to a rounded shoulder formed on the tapered outer surface of the sleeve.

3. The swage fitting of claim 1, wherein the fitting body connects the tube to another tube when the swage end is swaged to the sleeve and the tube and when the adapter end is fastened to the end fitting assembly.

4. The swage fitting of claim 1, wherein the recess has a smaller outer diameter than both the swage end of the fitting body and the adapter end of the fitting body.

5. A swage fitting for attachment to a tube, comprising:
a generally cylindrical fitting body having an internal axial bore that is configured to receive a sleeve that surrounds the tube and that has a tapered outer surface tapering in a radial outward direction from an end of the sleeve; and
a swage end formed at one end of the fitting body that has a tapered inner surface tapering in a radial inward direction beginning at the swage end, and a locking groove formed in the tapered inner surface, wherein
the tapered inner surface of the swage end is configured to compress and swage the tapered outer surface of the sleeve into the tube when the fitting body is swaged to the sleeve and the tube,
the locking groove is configured to receive a corresponding locking protrusion formed on the tapered outer surface of the sleeve to secure physical engagement between the sleeve and the fitting body during swaging,
an adapter end of the fitting body is configured to mate with an end fitting assembly, and
a shoulder is provided on an inner surface of the adapter end of the fitting body to restrict axial movement of the tube and the sleeve within the fitting body and to properly position the tube, the sleeve and the fitting body before and after swaging.

6. A swage fitting for attachment to a tube, comprising:
a generally cylindrical fitting body having an internal axial bore that is configured to receive a sleeve that surrounds the tube and that has a tapered outer surface tapering in a radial outward direction from an end of the sleeve; and
a swage end formed at one end of the fitting body that has a tapered inner surface tapering in a radial inward direction beginning at the swage end, and a locking groove formed in the tapered inner surface, wherein
the tapered inner surface of the swage end is configured to compress and swage the tapered outer surface of the sleeve into the tube when the fitting body is swaged to the sleeve and the tube,
the locking groove is configured to receive a corresponding locking protrusion formed on the tapered outer surface of the sleeve to secure physical engagement between the sleeve and the fitting body during swaging,
an adapter end of the fitting body is configured to mate with an end fitting assembly, and
the adapter end of the fitting body has an external thread for mating with an inner thread of the end fitting assembly.

* * * * *